(12) United States Patent
Kronebusch (10) Patent No.: US 10,159,862 B2
(45) Date of Patent: Dec. 25, 2018

(54) FIRE EXTINGUISHER WITH RECESSED GAUGE

(71) Applicant: Kronebusch Industries, LLC, Rochester, MN (US)

(72) Inventor: Allen R. Kronebusch, Oronoco, MN (US)

(73) Assignee: Kronebusch Industries, LLC, Rochester, MN (US)

(*) Notice: Subject to any disclaimer, the term of this patent is extended or adjusted under 35 U.S.C. 154(b) by 0 days.

(21) Appl. No.: 14/985,995

(22) Filed: Dec. 31, 2015

(65) Prior Publication Data

US 2017/0001050 A1  Jan. 5, 2017

Related U.S. Application Data

(60) Provisional application No. 62/187,228, filed on Jun. 30, 2015.

(51) Int. Cl.
*A62C 13/64* (2006.01)
*A62C 13/76* (2006.01)
(Continued)

(52) U.S. Cl.
CPC ............ *A62C 13/64* (2013.01); *A62C 13/003* (2013.01); *A62C 13/76* (2013.01); *G01K 1/14* (2013.01); *G01L 19/10* (2013.01)

(58) Field of Classification Search
CPC ....... A62C 13/64; A62C 13/003; A62C 13/76; G01L 19/10; G01K 1/14
(Continued)

(56) References Cited

U.S. PATENT DOCUMENTS

| 581,814 A | 5/1897 | Durkin |
| 2,681,707 A * | 6/1954 | Mapes ................ A62C 13/003 169/74 |

(Continued)

FOREIGN PATENT DOCUMENTS

| CN | 3049621 | 10/1996 |
| CN | 3372812 | 6/2004 |

(Continued)

OTHER PUBLICATIONS

阮兆华 Ruan Zhaohua, Fire extinguisher with pressure gauges on bottom, May 2008, English translation of Chinese Patent CN201055626.*

(Continued)

*Primary Examiner* — Chee-Chong Lee
(74) *Attorney, Agent, or Firm* — Merchant & Gould P.C.

(57) ABSTRACT

A fire extinguisher includes a container that has a chamber for holding a fire-extinguishing agent. The container also includes a domed top portion and recessed bottom portion. The domed top portion includes a valve port, and the recessed bottom portion has an edge for standing the container generally upright. The fire extinguisher also includes a valve attached to the valve port of the container and a dispenser attached to the container for operating the valve. The dispenser also includes a handle and a pivotable trigger. Further, the fire extinguisher includes a gauge mounted within the recessed bottom portion of the container. The gauge is configured to display at least one characteristic of the chamber of the container. Also, the gauge is mounted above the edge of the recessed bottom portion.

7 Claims, 5 Drawing Sheets

(51) Int. Cl.
    *A62C 13/00* (2006.01)
    *G01K 1/14* (2006.01)
    *G01L 19/10* (2006.01)

(58) Field of Classification Search
    USPC .......................................................... 169/75
    See application file for complete search history.

(56) References Cited

U.S. PATENT DOCUMENTS

| | | | |
|---|---|---|---|
| 2,779,472 A | | 1/1957 | Febbraro |
| 3,254,807 A | * | 6/1966 | Boch et al. .......... B65D 83/201 169/74 |
| 3,844,355 A | * | 10/1974 | Kreipe .................... A62C 13/76 169/71 |
| D244,578 S | | 6/1977 | Avant |
| 4,247,048 A | * | 1/1981 | Hayes ...................... B05B 1/12 222/553 |
| 4,267,890 A | * | 5/1981 | Myers .................... A62C 37/50 169/75 |
| 4,350,298 A | * | 9/1982 | Tada ...................... B05B 7/005 222/380 |
| 4,619,328 A | * | 10/1986 | Seyler ................... A62C 37/50 116/205 |
| 4,779,683 A | * | 10/1988 | Enk ....................... A62C 35/08 169/28 |
| 5,232,124 A | | 8/1993 | Schneider |
| 6,742,599 B1 | | 6/2004 | Nam |
| D660,155 S | | 5/2012 | Jenkins |
| D742,251 S | | 11/2015 | Kaanta |
| 2004/0035871 A1 | | 2/2004 | Chupak |
| 2005/0112022 A1 | | 5/2005 | Morgan |
| 2009/0223956 A1 | | 9/2009 | Matsukawa |
| 2009/0308946 A1 | | 12/2009 | Dube |
| 2012/0187067 A1 | | 7/2012 | Maas |
| 2012/0325503 A1 | | 12/2012 | Fishman |

FOREIGN PATENT DOCUMENTS

| | | | | |
|---|---|---|---|---|
| CN | 201055626 | * | 5/2008 | ............ A62C 13/00 |
| CN | 301038102 | | 10/2009 | |
| CN | 301331624 | | 8/2010 | |
| EM | 002165746-0001 | | 1/2013 | |
| EP | 1038799 A1 | | 9/2000 | |
| GB | 2039735 A | | 8/1980 | |
| JP | D1286742 | | 11/2006 | |

OTHER PUBLICATIONS

Ake Companies, LLC, Stop-Fyre Extinguisher, applicant admitted prior art, 2 pages.
Ake Companies, LLC, Stop-Fyre Extinguisher Aberdeen Ag Expo Flyer, applicant admitted prior art, 1 page.
Ake Companies, LLC, Stop-Fyre Extinguisher NTPA Advertisement, applicant admitted prior art, 1 page.
Ake Companies, www.ake.com, LLC, Stop-Fyre Extinguishers, Dec. 18, 2014, 3 pages.

\* cited by examiner

FIRE EXTINGUISHER WITH RECESSED GAUGE

CROSS-REFERENCE TO RELATED APPLICATION

This application claims priority to U.S. application Ser. No. 62/187,228, titled FIRE EXTINGUISHER WITH RECESSED GAUGE, filed on Jun. 30, 2015, the disclosure of which is hereby incorporated by reference in its entirety.

BACKGROUND

Fire extinguishers are sometimes used to extinguish or control small fires in emergency situations. A fire extinguisher typically includes a cylindrical pressure vessel containing an agent in a pressurized state. The agent can be discharged from the vessel and into the fire to extinguish the fire.

Fire extinguishers are often handheld devices that include a manual discharge trigger. Operation of the fire extinguisher involves removing a safety pin and squeezing a handle while aiming a nozzle of the fire extinguisher toward the fire. The agent is then discharged through the nozzle and into the fire.

SUMMARY

In general terms, this disclosure is directed to a fire extinguisher. In one possible configuration and by non-limiting example, this disclosure relates to a fire extinguisher having a recessed bottom portion for housing a gauge. Various aspects are described in this disclosure, which include, but are not limited to, the following aspects.

One aspect is a fire extinguisher that includes a container that has a chamber for holding a fire-extinguishing agent. The container also includes a domed top portion and a recessed bottom portion. The domed top portion includes a valve port, and the recessed bottom portion has an edge for standing the container generally upright. The fire extinguisher also includes a valve attached the valve port of the container and a dispenser attached to the container for operating the valve. The dispenser also includes a handle and a pivotable trigger. Further, the fire extinguisher includes a gauge mounted within the recessed bottom portion of the container. The gauge is configured to display at least one characteristic of the chamber of the container. Also, the gauge is mounted above the edge of the recessed bottom portion.

Another aspect is a fire extinguisher container that includes a main body portion that has a generally cylindrical shape. The fire extinguisher container also includes a domed portion adjacent the main body portion and a valve port in the domed portion that is configured to receive a dispenser. Further, the fire extinguisher container includes a bottom recess in the main body portion opposite of the domed portion. The bottom recess has a depth of at least about 0.75 inches.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
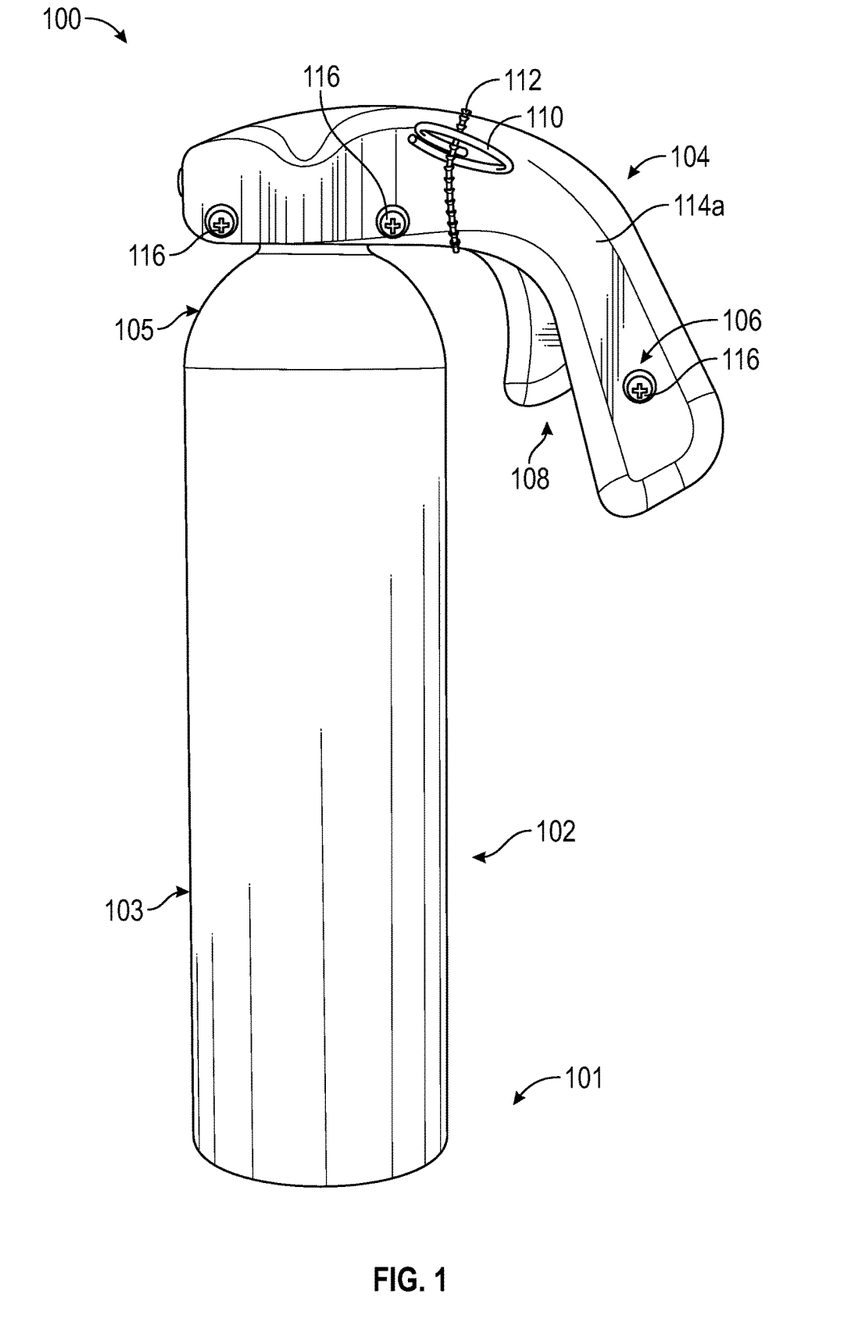
FIG. 1 illustrates a perspective view of a fire extinguisher, according to one embodiment of the present disclosure.

FIG. 1 is a perspective view of an example of a fire extinguisher 100 sitting upright on a flat surface 101. In this example, the fire extinguisher 100 includes a container 102 and a dispenser 104. In some embodiments, the fire extinguisher 100 is configured to be operated by a single hand of a user to extinguish a fire.

In the depicted embodiment, the fire extinguisher 100 is configured to be a ruggedized fire extinguisher 100 that is configured to be used in a variety of environments. In some embodiments, the fire extinguisher 100 can be stored in a variety of different orientations, easing storage and allowing the fire extinguisher 100 to be used in a variety of vehicles, cabinets, or other storage areas where storing traditional fire extinguishers is difficult. In some embodiments, the fire extinguisher 100 has a ruggedized construction so as to withstand a drop, an accidental impact, and other abuse. Additionally, the fire extinguisher 100 is constructed of materials that reduce the risk of the fire extinguisher 100 exploding and sending pieces into the air in the rare event of a catastrophic failure. In some embodiments, the fire extinguisher has a burst strength of between about 800 psi and 900 psi. In some embodiments, the fire extinguisher has a burst strength of about 850 psi.

As shown, the container 102 has a generally cylindrical main body portion 103 and a upper domed portion 105. In other embodiments, the container 102 can be of other shapes. The container 102 is a container configured to store a fire-extinguishing agent within an internal chamber 107 (shown in FIG. 4). In some embodiments, the container 102 stores the fire-extinguishing agent in a pressurized state. A variety of different extinguishing agents can be used, such as a powder-based agent, water, wet chemical, and clean agents. For example, different agents are used for different classes of fires, such as fires on ordinary combustibles including wood, cloth, paper, and plastics; fires on flammable liquids including gasoline, oil, grease, and tar; or fires on energized electrical equipment including wiring, fuse boxes, circuit breakers, and machinery. These and other agents can be used in various possible embodiments.

In some embodiments the container 102 is an aerosol spray can. The aerosol spray can includes a top that forms a permanent seal that prevents the agent from leaking from the container 102. The construction of the container 102 prevents leaking and allows the fire extinguisher 100 to last for an extended period time without requiring frequent servicing, unlike traditional fire extinguishers that typically require annual servicing and have limited shelf lives.

In other possible embodiments, the container 102 contains an agent usable for a purpose other than for extinguishing a fire. As one example, the agent is a repellant agent that can be used to repel humans or animals. An example of a repellant agent is a lychrymatory agent, such as pepper spray. A repellant agent can be used for policing, riot control, crowd control, and personal self-defense, for example.

The dispenser 104 is configured to manually dispense the fire-extinguishing agent from the container 102. The dispenser 104 includes a housing 106 a trigger 108, and a safety pin 110. In some embodiments, the dispenser 104 also includes a tamper seal 112. In some embodiments, the dispenser 104 is at least partially ornamental in nature and features nonfunctional elements. For example, the housing 106 includes curved profile.

Figure 2:
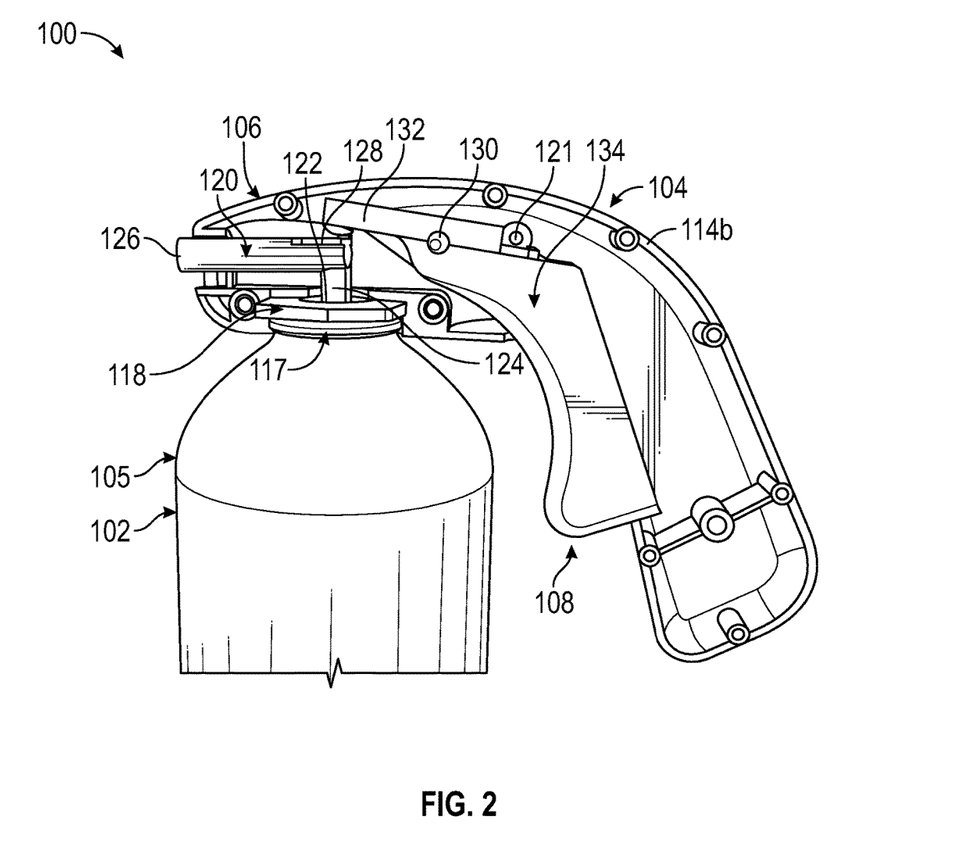
FIG. 2 illustrates a side view of fire extinguisher of FIG. 1 partially dissembled.

The housing 106 is configured to house a plurality of dispensing components discussed in more detail with respect to FIG. 2. In the depicted embodiment, the housing 106 includes two halves 114a, 114b. The halves 114a, 114b are connected to one another by way of a plurality of fasteners 116. As shown, the halves 114a, 114b are connected by three fasteners 116. The housing 106 is configured to surround the trigger 108.

The trigger 108 is configured to be pivotable so as to selectively activate the dispensing of the fire-extinguishing agent from the container 102. Specifically, the trigger 108 is configured to be pulled to activate the fire extinguisher 100. The trigger 108 is also at least partially ornamental in nature and features nonfunctional elements. As depicted, the trigger 108 is configured to be operated by a hand of an operator. Specifically, the operator may operate the trigger 108 while grasping the housing 106.

The safety pin 110 is configured to prevent accidental or premature dispensing of the fire-extinguishing agent from the fire extinguisher 100. In the depicted embodiment, the safety pin 110 passes through both halves 114a, 114b of the housing 106. In some embodiments, the safety pin 110 also passes through the trigger 108. The safety pin 110 prevents the rotation of the trigger 108 when installed within the housing 106. In other embodiments, other safety devices are used with the fire extinguisher 100. For example, a removable tab can be used to prevent rotation of the trigger 108.

The tamper seal 112 shown is configured to be a redundant safety measure to prevent accidental discharge of the fire extinguisher 100. The tamper seal 112 is configured to be installed through the safety pin 110 and around the housing 106 to help retain the safety pin within the housing 106. Such placement of the tamper seal 112 can help to retain the pin within the housing 106 during shipment of the fire extinguisher 100. In some embodiments, the tamper seal 112 serves to warn the user if the fire extinguisher 100 has been previously operated. In some embodiments, the tamper seal 112 is a tear-away seal configured to be removed by hand.

FIG. 2 shows a side view of a portion of fire extinguisher 100 with a half 114a removed from the housing 106 of the dispenser 104. As shown, the dispenser 104 is shown secured to the container 102 at a valve port 117 by way of a collet 118. Additionally, the dispenser 104 is shown to include an actuator 120 and the trigger 108 positioned within the housing 106. Further, a safety pin aperture 121 is shown in the housing half 114b. The safety pin aperture 121 is configured to receive the safety pin 110.

The valve port 117 provides access to the chamber 107 for the dispensing of the fire-extinguishing agent contained within the chamber 107. In some embodiments, the valve port 117 is configured to receive a valve (not shown). As shown, the valve port 117 can include a valve port lip 119. The valve port lip 119 helps add stability to the valve port 117 in addition to creating a mounting surface for the dispenser 104, specifically the collet 118.

The collet 118 is configured to be fixed to the container 102 and operate as intermediate connection connecting the dispenser 104 and the container 102. In this example, the collet 118 has an aperture 122 passing through its center so that the actuator 120 can be inserted through the aperture 122 and connect to a valve (not shown) positioned within the valve port 117. The collet 118 can preferably be made of plastic to minimize possible leakage of an agent from the container 102.

The actuator 120 operates to release a fire-extinguishing agent that has been contained in container 102 in a pressurized state and discharge the agent through the conduit formed within the actuator 120. In this example, the actuator 120 is installed to the container 102 and is selectively in fluid communication with a chamber 107 of the container 102, in which a fire-extinguishing agent is stored in a pressurized state. In some embodiments, the actuator 120 includes an inlet pipe 124, a discharging pipe 126, and a receptive portion 128. The inlet pipe 124 and the discharging pipe 126 are connected to be in fluid communication. In this example, the discharging pipe 126 is connected to the inlet pipe 124 substantially at a right angle. The inlet pipe 124 of the actuator 120 is mounted through the collet 118 and to a valve that is mounted within the valve port 117 of container 102. The actuator 120 can be retractably pressed toward the container 102. When the actuator 120 is pressed downward toward the container 102, the inlet pipe 124 of the actuator 120 becomes in fluid communication with the chamber 107 of the container 102 so that the agent stored in the chamber 107 in a pressurized state can be discharged through the inlet pipe 124. Specifically, the inlet pipe 124 of the actuator 120 is connected to the container 102 but is not in fluid communication with the chamber 107 when the fire extinguisher 100 is not in operation. In contrast, when the receptive portion 128 of the actuator 120 is pressed downward over a threshold pressure, the inlet pipe 124 of the actuator 120 is connected to the chamber 107 of the container 102, thereby allowing the pressurized agent stored in the chamber 107 to move from the chamber 107 to the inlet pipe 124 and then dispense from the discharging pipe 126.

The trigger 108 is configured to be operated so that the actuator 120 becomes in fluid communication with the chamber 107 of the container 102 to discharge the agent contained in the container 102. In one embodiment, the trigger 108 includes a pivot portion 130, an actuation portion 132, and a lever portion 134.

The pivot portion 130 of the trigger 108 is configured to be engaged with the housing 106 and permit the trigger 108 to pivot about the pivot portion 130. The pivot portion 130 is provided generally in the middle of the trigger 108. In this example, the pivot portion 130 includes a pair of opposing projections. The opposing projections of the pivot portion 130 are engaged with the halves 114a, 114b of the housing 106.

The actuation portion 132 of the trigger 108 is configured and arranged adjacent to the receptive portion 128 of the actuator 120 so that the actuation portion 132 presses down the actuator 120 on the receptive portion 128 when the trigger 108 is rotated in a counterclockwise direction about the pivot portion 130.

The lever portion 134 is at the opposite end of the trigger 108 than the actuation portion 132. The lever portion 134 is configured to receive a pulling force by the user of the fire extinguisher 100. When the safety pin 110 is removed from safety pin aperture 121 in the dispenser 104, a pulling force exerted on the lever portion 134 will rotate the trigger 108 and cause the actuation portion 132 to press downward on the actuator 120, dispensing fire-extinguishing agent therefrom.

Figure 3:
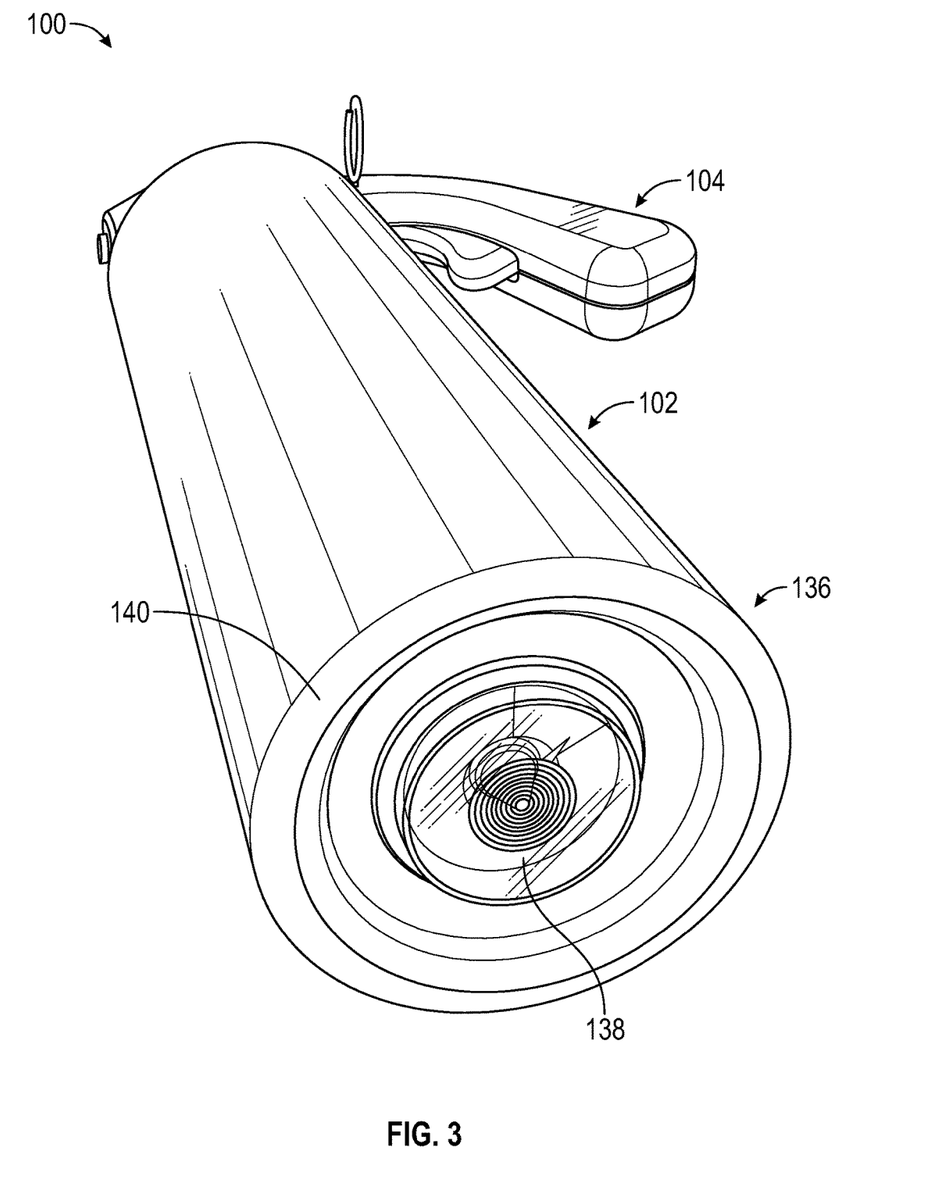
FIG. 3 illustrates a perspective bottom view of the fire extinguisher of FIG. 1.

FIG. 3 shows the fire extinguisher 100 having a recessed bottom portion 136. The recessed bottom portion 136 is at the opposite end of the container 102 from the dispenser 104 and the upper domed portion 105 and configured to house a gauge 138. In the depicted embodiment, the gauge 138 is shown seated within the recessed bottom portion 136 so that the fire extinguisher 100 may sit on a flat surface (as shown in FIG. 1).

In the depicted embodiment, the recessed bottom portion 136 is integral in the container. In some embodiments, the recessed bottom portion 136 is manufactured separately and attached to the container 102. Additionally, the recessed bottom portion 136 has an edge 140 for supporting the fire extinguisher 100 in an upright manner. The recessed bottom portion 136 will be discussed in more detail with respect to FIGS. 5-6.

The gauge 138 is configured to display a characteristic of the chamber 107 of the container 102. In some embodiments, the gauge 138 displays a pressure reading of the chamber 107. In other embodiments, the gauge 138 displays a temperature reading of the chamber 107. In still other embodiments, the gauge 138 displays a temperature and pressure reading of the chamber 107. In some embodiments, the gauge 138 measures the amount of fire-extinguishing agent remaining within the fire extinguisher 100.

Figure 4:
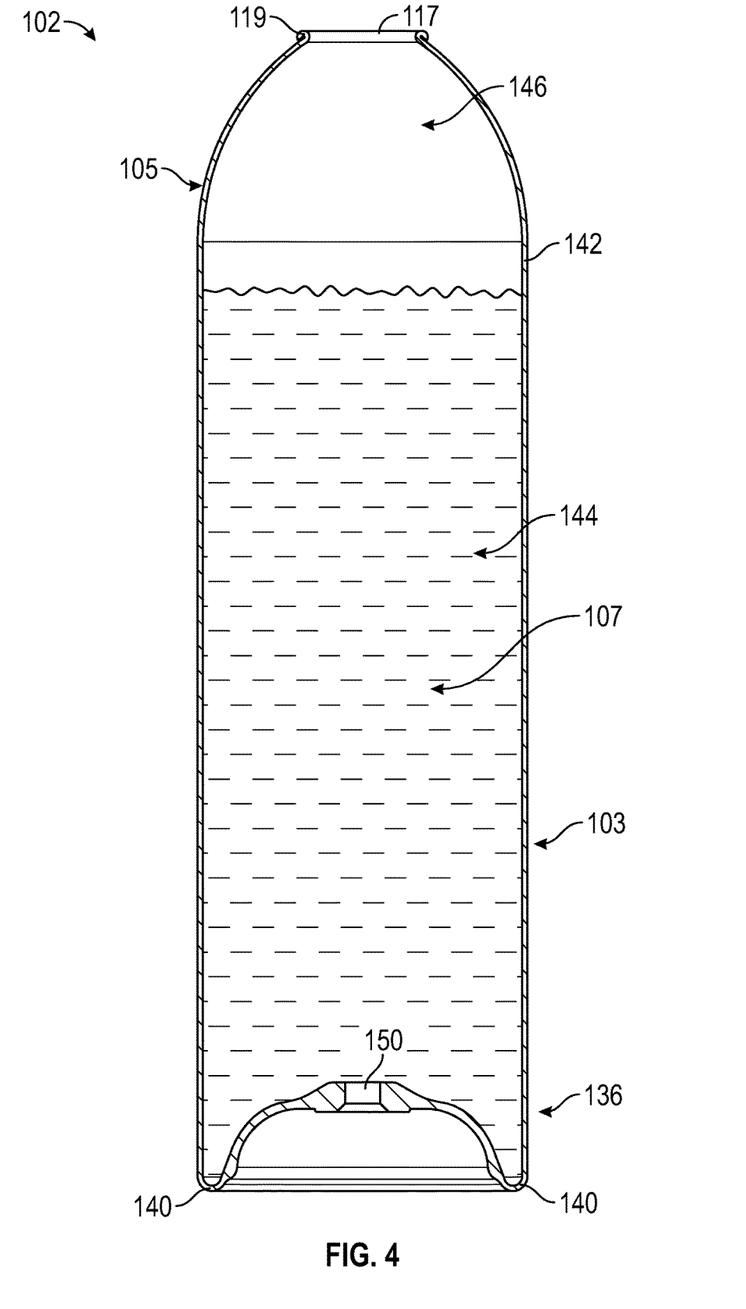
FIG. 4 illustrates a cross-sectional side view of a container of the fire extinguisher of FIG. 1.

FIG. 4 shows a cross-sectional side view of the container 102. The container 102 includes a wall 142, the main body portion 103, the upper domed portion 105, the chamber 107, the valve port 117, and the recessed bottom portion 136. In some embodiments, the container 102 is at least partially ornamental in nature and features nonfunctional elements.

The container 102 is configured to be manufactured from metal. In the depicted embodiment, the container 102 is manufactured from aluminum. In some embodiments, 6061 aluminum is used. In still other embodiments the container 102 is steel.

The container wall 142 surrounds the chamber 107. In some embodiments, the wall 142 has a minimum thickness of between about 0.025 inches and 0.050 inches. In other embodiments, the wall has a minimum thickness of about 0.050 inches. In some embodiments, the main body portion 103, the upper domed portion 105, and the recessed bottom portion 136 have the same wall thickness. In other embodiments, the main body portion 103 and the upper domed portion 105 have the same wall thickness, while the recessed bottom portion 136 has a wall thickness greater than the main body portion 103 and the upper domed portion 105.

The main body portion 103 of the container 102 is configured to extend between the upper domed portion 105 and the recessed bottom portion 136. In some embodiments, the main body portion 103 has a consistent cross-section. In other embodiments, the main body portion 103 has an inconsistent cross-section. The main body portion 103 can include ornamental features, such as indentations and protrusions. In other embodiments, the main body portion 103 includes functional features such as features that allow the container 102 to be accepted by a mounting device.

The upper domed portion 105 is shown as an integral part of the container 102, located above the main body portion 103. In some embodiments, the upper domed portion 105 is attached to the main body portion 103. The upper domed portion 105 is shown to include walls 142 that arc from the main body portion 103 to the valve port 117. The upper domed portion 105 can be a variety of different shapes, such as polygonal shapes.

The chamber 107 is the space within the container walls 142. In some embodiments, the container 102 includes a chamber lining on the inside of the walls 142 to help prevent corrosion and/or act as an insulator for the chamber 107. The chamber 107 includes a single compartment but may include multiple compartments for storage of a plurality of fire-extinguishing agents. When assembled as part of a fire extinguisher, the container 102, and specifically the chamber 107, is configured to be filled with fire-extinguishing agent. In some embodiments, the chamber 107 has a maximum fill level of about 80% of the container 102's capacity. In such an embodiment, the chamber 107 includes a liquid space 144 and a head space 146. By leaving a head space 146, the head space 146 can contain a gas that can be compressed in order to pressurize the entire container 102 and facilitate the removal of the fire-extinguishing agent from the chamber 107. In some embodiments, the chamber 107 is configured to hold about 1750 grams of fire-extinguishing agent at maximum fill level.

The valve port 117 provides access to the chamber 107. The valve port 117 can be a variety of shapes and sizes. Additionally, as shown, the walls 142 of the container 102 are curled to create the valve port lip 119.

The recessed bottom portion 136 is shown positioned at the opposite end of the container 102 than the upper domed portion 105. The recessed bottom portion 136 includes the edge 140 that is configured to support the container 102 and a port 150 that is configured to receive the gauge 138.

The container 102 can be sized to be easily handled by a single hand of an operator. In some embodiments, the container 102 has a height of about 11 inches.

The container 102 is manufactured using impact extrusion to form the general shape of the container 102 and the recessed bottom portion 136. A necking machine is used to the form the upper domed portion 105 and the lip 119 of the valve port 117 is then created by curl milling on a curling machine. Other manufacturing methods can be used to add features to the container 102 (i.e., protrusion or indentations).

Figure 5:
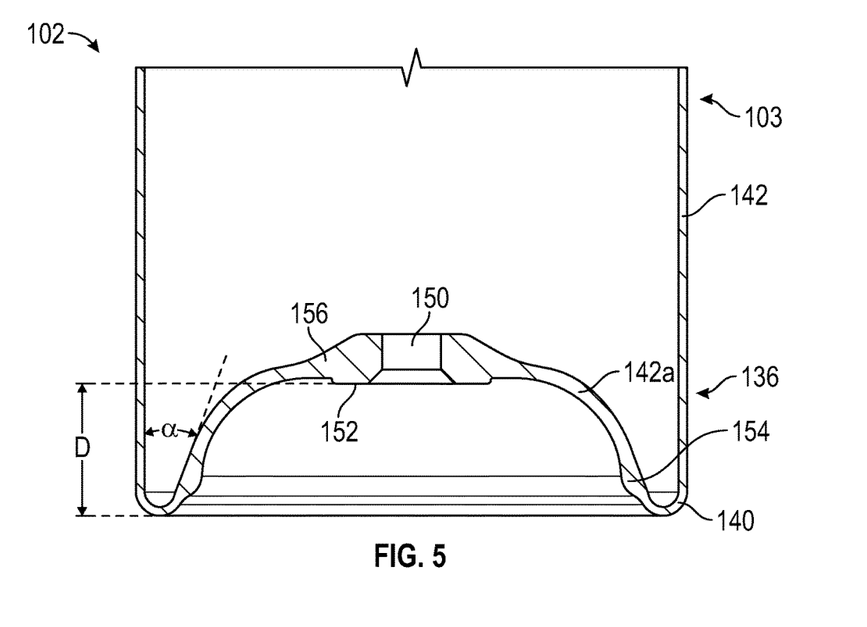
FIG. 5 illustrates a cross-sectional side view of the recessed bottom portion of the container of the fire extinguisher of FIG. 1.

FIG. 5 shows a portion of the container 102, specifically the recessed bottom portion 136. The recessed bottom portion 136 includes the edge 140, the port 150, and a mounting flange 152. The recessed bottom portion 136 is generally dome shaped, with the port 150 and mounting flange 152 positioned at the deepest portion of the recessed bottom portion 136. The recessed bottom portion 136 can have a variety of different profiles including, but not limited to, a half-square or cone profile.

The edge 140 is shown to have a rounded profile. In some embodiments, the edge has a generally squared profile. In the depicted embodiment, adjacent to the edge 140 is a strength feature 154. The strength feature 154 is a portion of the wall 142 that has a thickness greater than the thickness of the wall 142 of the edge 140. The strength feature 154 helps to reduce the potential of collapse of the recessed bottom portion 136. Also shown, a wall 142a of the recessed bottom portion 136 has an increased thickness between the strength feature 154 and the port 150. By increasing the thickness of the wall 142a of the recessed bottom portion 136, the durability and strength of the container 102 is increased.

The port 150 is shown disposed at the deepest portion of the recessed bottom portion 136. The port 150 is configured to receive the gauge 138 (shown in FIG. 5). In some embodiments, the port 150 is threaded. In some embodiments, the port 150 includes at least seven threads. In the depicted embodiment, the port 150 is also countersunk to accommodate the gauge 138. The recessed bottom portion 136 also includes a reinforced portion 156 at least partially surrounding the port 150. The reinforced portion 156 improves the strength of the port 150. In addition, it allows the port 150 to have a desired thickness so as to be able to include additional threads for proper seating of the gauge 138 within the port 150.

The flange 152 is configured to receive a portion of the gauge 138. The flange 152 is also configured to allow the gauge 138 to effectively seat within the recessed bottom portion 136 so as to aid with creating a proper seal between the port 150 and the gauge 138 when the gauge 138 is installed in the port. In some embodiments, the flange 152 includes a seal (not shown) disposed thereon. In some examples, the seal is an O-ring.

The recessed bottom portion 136 has a depth D measured from the flange 152 to bottom of the edge 140. In some embodiments, the depth D is about 0.750 inches. In other embodiments, the depth D is between about 0.625 inches and 0.750 inches. To accommodate the recessed bottom portion 136 with a depth D, the walls 142a have an angle α with the walls 142 of the main body portion 103. In some embodiments, the angle α is between about 19 degrees and about 23 degrees. In some embodiments, the angle α is about 21 degrees. In some embodiments, the port 150 has a diameter of about 0.125 inches. Additionally, in some embodiments, the port 150 has a ⅛-27 NPT pipe thread.

Figure 6:
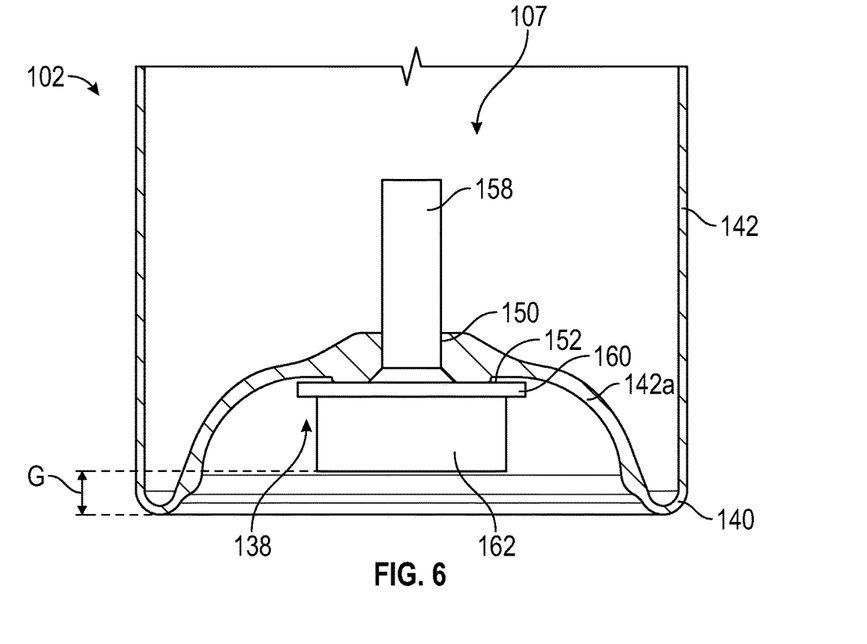
FIG. 6 illustrates a cross-sectional side view of the recessed bottom portion of the container of the fire extinguisher of FIG. 1 with a gauge installed.

FIG. 6 shows a portion of the container 102, specifically the recessed bottom portion 136, with a gauge 138 installed into the port 150. The gauge 138 is shown to include a sensing portion 158, a mounting lip 160, and a display 162. The gauge 138 is configured to be mounted to the recessed bottom portion 136 of the container 102 so that, when mounted, the gauge 138 does not contact a generally flat surface when the edge 140 is in contact with the flat surface. Therefore, the gauge 138 is preferably mounted fully above the lowest point of the edge 140.

The sensing portion 158 of the gauge 138 is configured to be in communication with the chamber 107 of the container 102 so as to gather a reading that is representative of a characteristic of the chamber 107. In some embodiments, the sensing portion 158 is configured to sense a pressure, a temperature, and/or a quality characteristic of the chamber 107. In some embodiments, at least a portion of the sensing portion 158 is threaded into the port 150. In some embodiments, at least seven threads of the sensing portion 158 are threaded into the port 150. Glue may be used to further secure the sensing portion 158 within the port 150.

The mounting lip 160 of the gauge 138 is shown seated against the flange 152 of the recessed bottom portion 136. The mounting lip 160 is attached to the sensing portion 158 and to the display 162. In some embodiments, the mounting lip includes an integral seal (not shown).

The display 162 is shown attached to the mounting lip 160. The display 162 includes a readout that is representative of the characteristic or characteristics that the sensing portion 158 senses within the chamber 107. In the depicted embodiment, the display 162 of the gauge 138 is shown a distance G above the bottom of the edge 140. In some embodiments, the distance G is about 0.125 inches.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:
1. A fire extinguisher comprising:
   a container having a chamber for holding a fire-extinguishing agent, the container including:
     a domed top portion that includes a valve port; and
     a bottom edge;
     a wall portion extending between the domed top portion and the bottom edge;
     a recessed bottom portion recessed from the bottom edge of the container, wherein at least part of the recessed bottom portion has a thickness greater than a thickness of the wall portion;
     wherein the recessed bottom portion further comprises:
       a threaded port; and
       a reinforced portion at least partially surrounding the port and including a flange surface;
   a valve attached to the valve port of the container;
   a dispenser attached to the container for operating the valve, the dispenser having a handle and a trigger, the trigger including a pivot portion, an actuation portion, and a lever portion;
   wherein the pivot portion is configured to:
     engage with a housing of the dispenser,
     permit the trigger to pivot about the pivot portion, and
     rotate about a pair of opposing projections;
   wherein the lever portion is configured to receive a pulling force from a user of the fire extinguisher to rotate the trigger and cause the actuation portion to actuate an actuator; and
     a gauge mounted to the port and contained within the recessed bottom portion of the container such that the entirety of the gauge is recessed from the bottom edge of the container, the gauge being sealed against the flange surface and having an indicator that displays at least one characteristic of the chamber.

2. The fire extinguisher of claim 1, wherein the at least one characteristic is a temperature.

3. The fire extinguisher of claim 1, wherein the at least one characteristic is a pressure.

4. The fire extinguisher of claim 1, wherein the at least one characteristic is a pressure and a temperature.

5. The fire extinguisher of claim 1, wherein the recessed bottom portion has a depth of at least about 0.75 inches from the bottom edge.

6. The fire extinguisher of claim 1, wherein the container has a thickness of at least about 0.050 inches.

7. The fire extinguisher of claim 1, wherein the container is aluminum.

* * * * *